US012793410B2

United States Patent

(12) United States Patent
Liu et al.

(10) Patent No.: US 12,793,410 B2
(45) Date of Patent: Nov. 10, 2026

(54) NOXIOUS WEED IDENTIFICATION METHOD BASED ON SATELLITE, UAV, AND NEAR-GROUND IMAGE, AND DEVICE

(71) Applicant: Chengdu University of Technology, Chengdu City (CN)

(72) Inventors: Enqin Liu, Chengdu City (CN); Huaiyong Shao, Chengdu City (CN); Lin Yi, Chengdu City (CN); Lei Guan, Chengdu City (CN); Dingru Mo, Chengdu City (CN); Man Yang, Chengdu City (CN)

(73) Assignee: Chengdu University of Technology, Chengdu City (CN)

( * ) Notice: Subject to any disclaimer, the term of this patent is extended or adjusted under 35 U.S.C. 154(b) by 182 days.

(21) Appl. No.: 18/970,158

(22) Filed: Dec. 5, 2024

(65) Prior Publication Data

US 2026/0100037 A1 Apr. 9, 2026

(30) Foreign Application Priority Data

Oct. 8, 2024 (CN) ......................... 202411396807.1

(51) Int. Cl.
*G06V 20/10* (2022.01)
*G06V 10/54* (2022.01)
(Continued)

(52) U.S. Cl.
CPC ............ *G06V 20/188* (2022.01); *G06V 10/54* (2022.01); *G06V 10/58* (2022.01); *G06V 10/758* (2022.01);
(Continued)

(58) Field of Classification Search
CPC ...... G06V 20/188; G06V 10/54; G06V 10/58; G06V 10/758; G06V 10/774; G06V 10/82;
(Continued)

(56) References Cited

FOREIGN PATENT DOCUMENTS

| | | | | | |
|---|---|---|---|---|---|
| CN | 117690023 A | * | 3/2024 | ............. | G06V 10/58 |
| CN | 119580102 A | * | 3/2025 | ........... | G06V 10/764 |

OTHER PUBLICATIONS

Fei Xing et al., Mapping invasive noxious weed species in the alpine grassland ecosystems using very high spatial resolution UAV hyperspectral imagery and a novel deep learning mode Giscience & Remote Sensing 2024, vol. 61, published Mar. 2, 2024,I (Year: 2024).*

(Continued)

*Primary Examiner* — Mekonen T Bekele
(74) *Attorney, Agent, or Firm* — Umberg Zipser LLP; Ryan Dean

(57) ABSTRACT

Provided are a noxious weed identification method based on a satellite, a UAV, and near-ground images, and a device, which relates to the technical field of image identification. The method includes the following steps: inputting a current region-scale satellite remote sensing image into a region-scale noxious weed identification model, to obtain a region-scale noxious weed abundance identification result. The region-scale noxious weed identification model is obtained through training based on a historical region-scale feature data set and a predicted plot-scale noxious weed abundance identification result; the historical region-scale feature data set is a data set obtained by sifting historical region-scale satellite remote sensing images based on a historical quadrat-scale feature variable; and the historical quadrat-scale feature variable is a feature obtained by processing a historical near-ground hyperspectral image of a target region.
(Continued)

By adopting the above steps, the present application improves the identification precision of the noxious weed abundance.

18 Claims, 6 Drawing Sheets

(51) Int. Cl.

| | |
|---|---|
| ***G06V 10/58*** | (2022.01) |
| ***G06V 10/75*** | (2022.01) |
| ***G06V 10/774*** | (2022.01) |
| ***G06V 10/82*** | (2022.01) |
| ***G06V 20/13*** | (2022.01) |
| ***G06V 20/17*** | (2022.01) |
| ***G06V 20/20*** | (2022.01) |

(52) U.S. Cl.
CPC ............ *G06V 10/774* (2022.01); *G06V 10/82* (2022.01); *G06V 20/13* (2022.01); *G06V 20/17* (2022.01); *G06V 20/20* (2022.01)

(58) Field of Classification Search
CPC ........ G06V 20/13; G06V 20/17; G06V 20/20; G06V 20/194; G06V 10/52; G06V 10/72; Y02A 40/10
See application file for complete search history.

(56) References Cited

OTHER PUBLICATIONS

Hao-Ran et al., Deep Learning-Based Weed-Crop Recognition for Smart Agricultural Equipment: A Review, Agronomy 2024, 14, 363 pub. Feb. 11, 2024, (Year: 2024).*

* cited by examiner

NOXIOUS WEED IDENTIFICATION METHOD BASED ON SATELLITE, UAV, AND NEAR-GROUND IMAGE, AND DEVICE

CROSS REFERENCE TO RELATED APPLICATION

This patent application claims the benefit and priority of Chinese Patent Application No. 202411396807.1, filed with the China National Intellectual Property Administration on Oct. 8, 2024, the disclosure of which is incorporated by reference herein in its entirety as part of the present application.

TECHNICAL FIELD

The present disclosure relates to the technical field of image identification, and in particular, to a noxious weed identification method based on a satellite, an unmanned aerial vehicle (UAV), and near-ground images, and a device.

BACKGROUND

In recent years, due to climate change and unreasonable human activities (such as overgrazing), alpine grassland ecosystems are facing severe invasions of noxious weeds, leading to a gradual decline in both the productivity and ecological service functions of the grasslands. The invasion and spread of noxious weeds have become significant factors limiting the sustainable development of grassland animal husbandry and have seriously affected the ecological security of the grasslands. Therefore, it is essential to identify the distribution of noxious weeds to implement effective control measures. However, the precision of current identification methods for noxious weeds is insufficient, which hampers the ability to accurately assess the region-scale distribution of noxious weeds and restricts further advancements in controlling the noxious weeds.

SUMMARY

The purpose of the present application is to provide a noxious weed identification method based on a satellite, a UAV, and near-ground images, and a device, to improve the identification precision of the noxious weed abundance.

To achieve the above objective, the present application provides the following technical solutions.

According to a first aspect, the present application provides a noxious weed identification method based on a satellite, a UAV, and near-ground images, including:

A current region-scale satellite remote sensing image of a target region is obtained.

The current region-scale satellite remote sensing image is input into a region-scale noxious weed identification model matching the current region-scale satellite remote sensing image, to obtain a region-scale noxious weed abundance identification result.

A process of determining the region-scale noxious weed identification model includes:

A historical plot-scale hyperspectral image of the target region is obtained, where the historical plot-scale hyperspectral image is collected by the UAV.

The historical plot-scale hyperspectral image is input into a plot-scale noxious weed identification model matching the historical plot-scale hyperspectral image, to obtain a plot-scale noxious weed abundance identification result.

A region-scale noxious weed identification network is trained based on a historical region-scale feature data set and the plot-scale noxious weed abundance identification result, to obtain the region-scale noxious weed identification model, where the historical region-scale feature data set is a data set obtained by sifting historical region-scale satellite remote sensing images based on a historical quadrat-scale feature variable; and the historical quadrat-scale feature variable is a feature obtained by processing a historical near-ground hyperspectral image of the target region.

Optionally, a process of training the plot-scale noxious weed identification model matching the plot-scale hyperspectral image includes:

- constructing a historical plot-scale feature data set;
- obtaining a historical quadrat-scale noxious weed identification result; and
- training a plot-scale noxious weed identification network by using the historical plot-scale feature data set and the historical quadrat-scale noxious weed identification result, to obtain the plot-scale noxious weed identification model.

Optionally, a process of determining the historical plot-scale feature data set includes:

A plurality of historical plot-scale hyperspectral images are sifted based on the historical quadrat-scale feature variable, to sift out a plurality of historical plot-scale hyperspectral images used for noxious weed identification.

The historical plot-scale feature data set is constructed based on the plurality of historical plot-scale hyperspectral images used for noxious weed identification.

Optionally, a process of determining the historical region-scale feature data set includes:

The plurality of historical region-scale satellite remote sensing images of the target region are obtained.

The plurality of historical region-scale satellite remote sensing images are sifted based on the historical quadrat-scale feature variable, to sift out a plurality of historical region-scale satellite remote sensing images used for noxious weed identification.

The historical region-scale feature data set is constructed based on the plurality of historical region-scale satellite remote sensing images used for noxious weed identification.

Optionally, the region-scale noxious weed identification network is a three-dimensional convolutional neural network.

Optionally, the three-dimensional convolutional neural network includes X input layers, three convolution layers, three maximum pooling layers, three fully connected layers, and one output layer.

Optionally, the historical near-ground hyperspectral image includes a plurality of sub-images, and a process of determining the historical quadrat-scale feature variable includes:

performing following operations on each sub-image:

The sub-image is processed to obtain a noxious weed spectral feature and a pasture spectral feature corresponding to the sub-image, and a first difference is calculated based on the noxious weed spectral feature and the pasture spectral feature corresponding to the sub-image.

The sub-image is processed according to a gray-level co-occurrence matrix (GLCM)-based method, to obtain a noxious weed texture feature and a pasture texture feature corresponding to the sub-image, and a second difference is calculated based on the noxious weed texture feature and the pasture texture feature corresponding to the sub-image.

Whether the sub-image is an image with an identified noxious weed feature is determined based on the first difference or the second difference; and if yes, the noxious weed spectral feature and the noxious weed texture feature corresponding to the sub-image are determined as the historical quadrat-scale feature variable.

Optionally, the spectral feature includes: band reflectance, and first derivative spectrum and a spectral index calculated based on a reflectance image.

The first difference includes: a difference between noxious weed band reflectance and pasture band reflectance, a difference between noxious weed first derivative spectrum and pasture first derivative spectrum, and a difference between a noxious weed spectral index and a pasture spectral index.

The texture feature includes: a gray value mean, a gray value variance, image contrast, image entropy, an image second moment, image correlation, image synergy, and image anisotropy.

The second difference includes: a difference between a noxious weed gray value mean and a pasture gray value mean, a difference between a noxious weed gray value variance and a pasture gray value variance, a difference between noxious weed image contrast and pasture image contrast, a difference between noxious weed image entropy and pasture image entropy, a difference between a noxious weed image second moment and a pasture image second moment, a difference between noxious weed image correlation and pasture image correlation, a difference between noxious weed image synergy and pasture image synergy, and a difference between noxious weed image anisotropy and pasture image anisotropy.

Optionally, said determining, based on the first difference or the second difference, whether the sub-image is an image with an identified noxious weed feature includes:

Whether the first difference of each sub-image is greater than a first significance threshold is determined by using a Mahalanobis distance method; and if yes, the sub-image is determined as the image with the identified noxious weed feature.

Whether the second difference of each sub-image is greater than a second significance threshold is determined by using the Mahalanobis distance method; and if yes, the sub-image is determined as the image with the identified noxious weed feature.

According to a second aspect, the present application provides a computer device, including a memory, a processor, and a computer program stored in the memory and executable on the processor. The processor executes the computer program to implement the noxious weed identification method based on a satellite, a UAV, and near-ground images.

According to specific embodiments provided in the present application, the present application discloses the following technical effects:

The present application provides a noxious weed identification method based on a satellite, a UAV, and near-ground images, and a device. A current region-scale satellite remote sensing image of a target region is obtained and input into a region-scale noxious weed identification model, to obtain a region-scale noxious weed abundance identification result. The region-scale noxious weed identification model is obtained through training based on a historical region-scale feature data set and a predicted plot-scale noxious weed abundance identification result; the historical region-scale feature data set is a data set obtained by sifting historical region-scale satellite remote sensing images based on a historical quadrat-scale feature variable; and the historical quadrat-scale feature variable is a feature obtained by processing a historical near-ground hyperspectral image of the target region.

The present application first trains the plot-scale noxious weed identification model by using measured data from sample points in the plot and plot-scale hyperspectral images to, to obtain the plot-scale noxious weed identification result. Then, the region-scale noxious weed identification model is trained based on the plot-scale noxious weed identification result and the historical region-scale satellite remote sensing image, to obtain the region-scale noxious weed abundance identification result. By incorporating the historical plot-scale hyperspectral image, the present application effectively bridges the scale gap between the historical near-ground hyperspectral image and the historical region-scale satellite remote sensing image during the modeling process, significantly enhancing the identification precision of the noxious weed abundance.

According to the present application, before training the model, the historical quadrat-scale feature variable is used to sift the historical region-scale satellite remote sensing images and the historical plot-scale hyperspectral images. This process eliminated a substantial number of images not beneficial to noxious weed identification, retaining only a small number of historical region-scale satellite remote sensing images and historical plot-scale hyperspectral images used for noxious weed identification. As a result, the speed of training the noxious weed identification model based on the historical region-scale satellite remote sensing images and the historical plot-scale hyperspectral image is increased, and the trained model exhibits improved precision.

BRIEF DESCRIPTION OF THE DRAWINGS

To describe the technical solutions in the examples of this application or in the prior art more clearly, the following briefly describes the accompanying drawings required for the examples. Apparently, the accompanying drawings in the following description show merely some examples of this application, and a person of ordinary skill in the art may still derive other accompanying drawings from these accompanying drawings without creative efforts.

DETAILED DESCRIPTION OF THE EMBODIMENTS

The technical solutions in the embodiments of the present application are described below clearly and completely with reference to the drawings in the embodiments of the present application. Apparently, the described embodiments are merely part rather than all of the embodiments of the present application. All other embodiments obtained by those of ordinary skill in the art based on the embodiments of the present application without creative efforts should fall within the protection scope of the present application.

Currently, remote sensing observations for noxious weed identification are primarily based on the scale of ground quadrats or involve small-scale observations that combine ground quadrat images with plot UAV remote sensing images. In contrast, the remote sensing identification of noxious weed abundance at a region scale is rare and mainly relies on combining ground quadrat images with satellite-borne remote sensing images. Due to the significant scale difference between ground quadrat images and satellite-borne remote sensing images, the method combining ground quadrat images with satellite-borne remote sensing images often leads to challenges with scale convergence, resulting in poor identification precision. To address the issues of scale convergence between quadrat images and satellite-borne remote sensing images and low identification precision during noxious weed identification, the present disclosure proposes a noxious weed identification method based on a satellite, a UAV, and near-ground images. By employing the UAV to obtain plot-scale hyperspectral images, the method effectively bridges the scale gap between near-ground quadrat-scale hyperspectral images and region-scale satellite remote sensing images (satellite-borne remote sensing images) during the modeling process. This approach enhances the identification precision of the noxious weed abundance at the region scale (that is, the scale of satellite-borne remote sensing images).

It should be noted that the region-scale satellite remote sensing images, plot-scale hyperspectral images, and near-ground hyperspectral images mentioned in the specification are all remote sensing images.

To make the above objectives, features, and advantages of the present application more obvious and easy to understand, the present application will be further described in detail with reference to the accompanying drawings and specific implementations.

Figure 1:
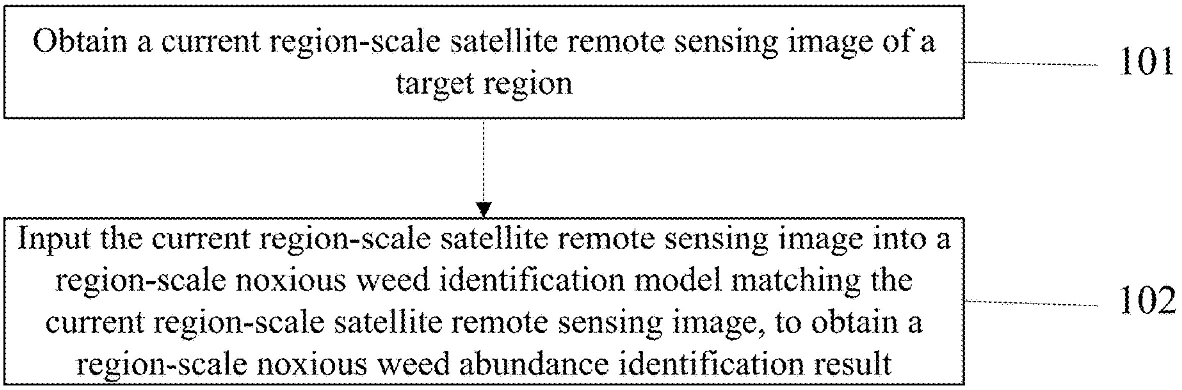
FIG. 1 is a flowchart of a noxious weed identification method based on a satellite, a UAV, and near-ground images according to Embodiment 1 of the present application.

In an exemplary Embodiment 1, as shown in FIG. 1, a noxious weed identification method based on a satellite, a UAV, and near-ground images is provided. The method includes the following steps:

Step 101: Obtain a current region-scale satellite remote sensing image of a target region.

Step 102: Input the current region-scale satellite remote sensing image into a region-scale noxious weed identification model matching the current region-scale satellite remote sensing image, to obtain a region-scale noxious weed abundance identification result.

Figure 2:
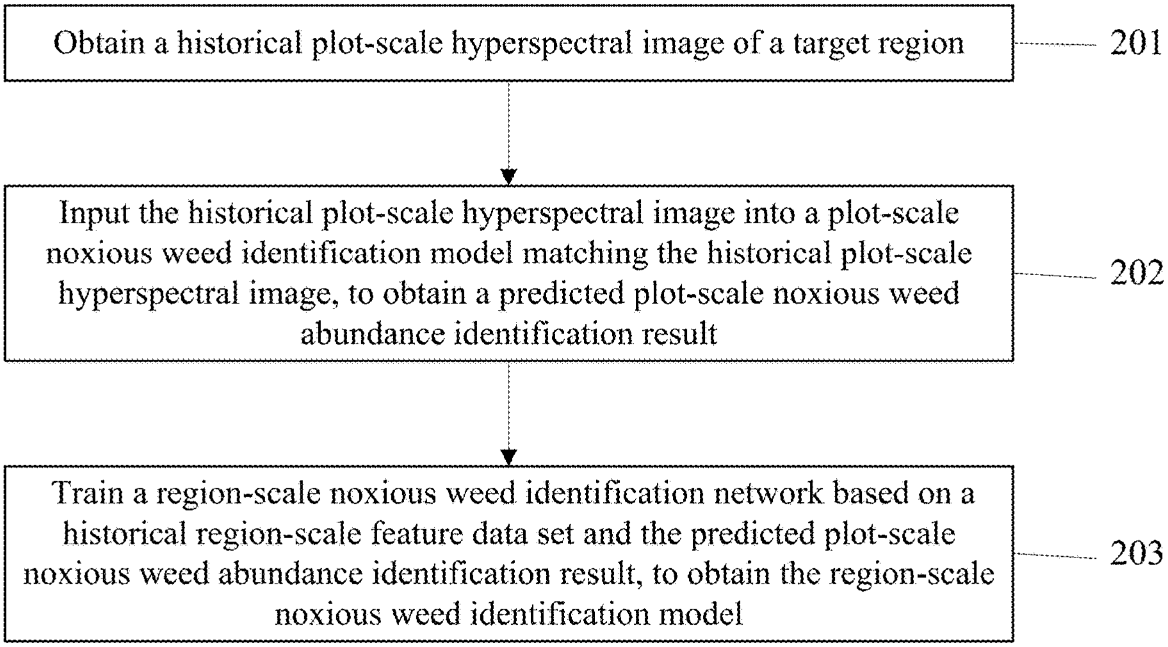
FIG. 2 is a schematic flowchart of a process of determining a region-scale noxious weed identification model according to the Embodiment 1 of the present application.

Further, as shown in FIG. 2, a process of determining the region-scale noxious weed identification model includes:

Step 201: Obtain a historical plot-scale hyperspectral image of the target region.

In an exemplary embodiment, in the step 201, the historical plot-scale hyperspectral image is collected by the UAV, which is DJI M600 PRO, and an imaging spectrometer is mounted on the UAV. The UAV flies vertically over the plot from a height of about 50 meters above the ground in clear and cloudless weather with low wind speeds, to obtain hyperspectral images between 10 AM and 2 PM.

Before collecting the plot-scale hyperspectral images, the following preparatory work should be completed:

Typical alpine degraded grassland is chosen as the plot, in which standard white boards and positioning signs are arranged. The plot of typical alpine degraded grassland should include common noxious weeds (such as *Stellera chamaejasme* L. and *Ligularia sibirica* (L.) Cass.) and common fine pasture (such as *Kobresia sichuanensis* and *Carex alatauensis* S. R. Zhang). The purpose of arranging the standard white boards is to calculate the spectral reflectance of the images, while the positioning signs are used for subsequent stitching of a plurality of flight strip images and geometric correction.

Step 202: Input the historical plot-scale hyperspectral image into a plot-scale noxious weed identification model matching the historical plot-scale hyperspectral image, to obtain a predicted plot-scale noxious weed abundance identification result.

Step 203: Train a region-scale noxious weed identification network based on a historical region-scale feature data set and the predicted plot-scale noxious weed abundance identification result, to obtain the region-scale noxious weed identification model.

The historical region-scale feature data set is a data set obtained by sifting historical region-scale satellite remote sensing images based on a historical quadrat-scale feature variable; and the historical quadrat-scale feature variable is a feature obtained by processing near-ground hyperspectral images of the target region.

Figure 3:
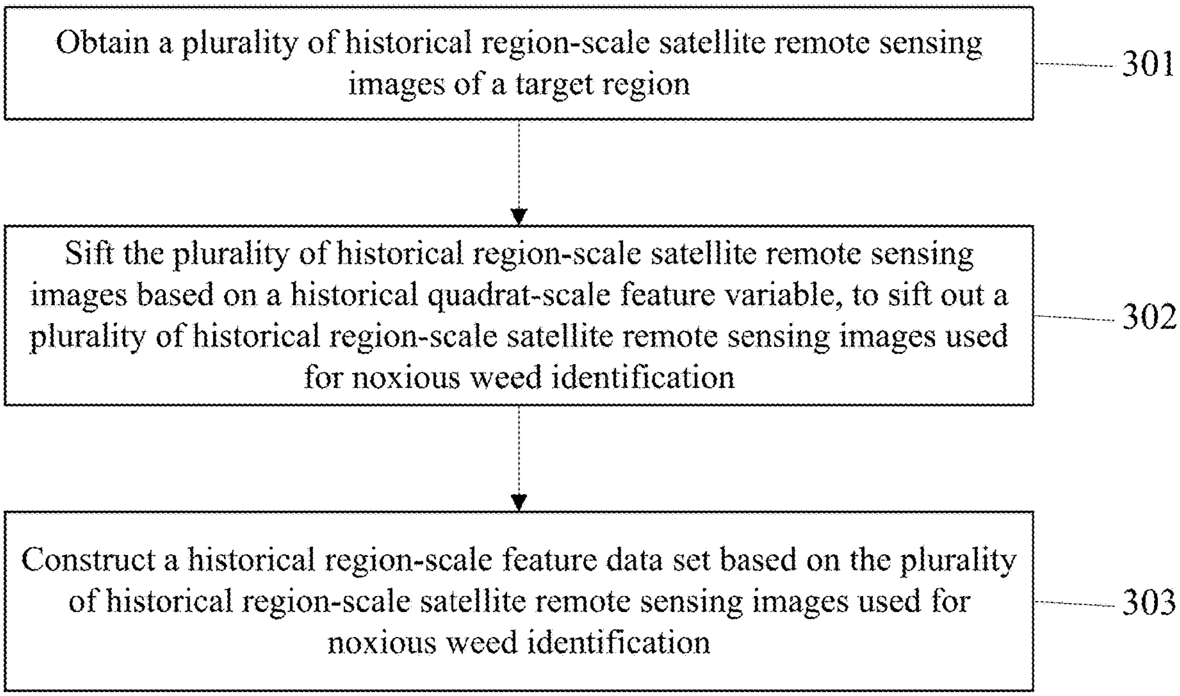
FIG. 3 is a schematic flowchart of a process of determining a historical region-scale feature data set in FIG. 2.

Further, as shown in FIG. 3, a process of determining the historical region-scale feature data set includes:

Step 301: Obtain the plurality of historical region-scale satellite remote sensing images of the target region.

Step 302: Sift the plurality of historical region-scale satellite remote sensing images based on the historical quadrat-scale feature variable, to sift out a plurality of historical region-scale satellite remote sensing images used for noxious weed identification.

Step 303: Construct the historical region-scale feature data set based on the plurality of historical region-scale satellite remote sensing images used for noxious weed identification.

Figure 4:
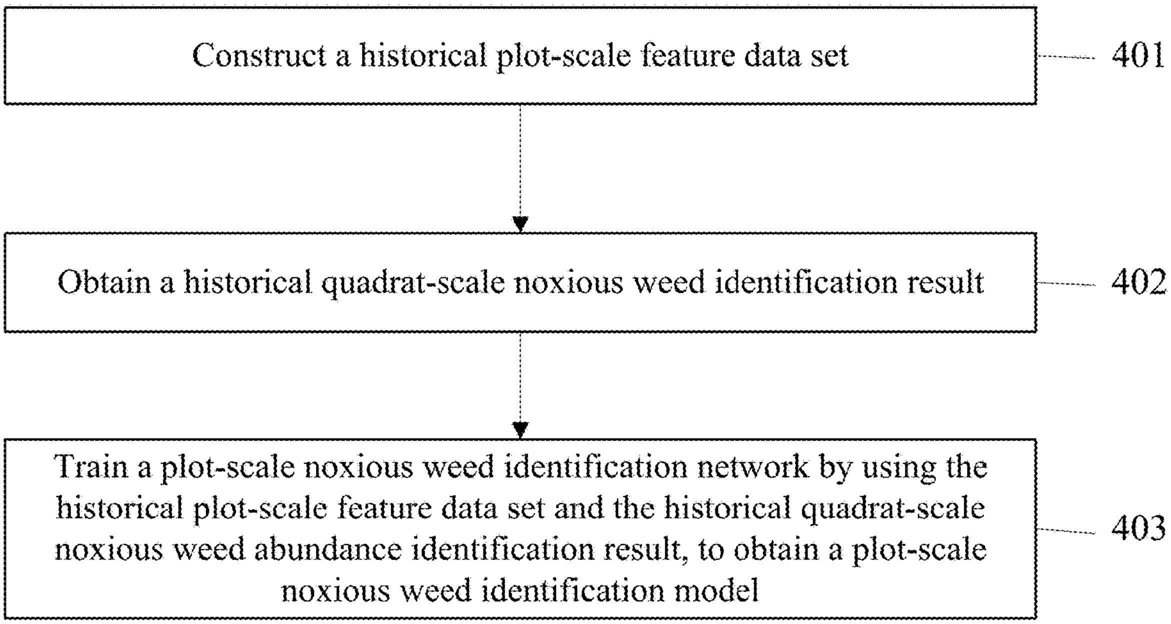
FIG. 4 is a schematic flowchart of a process of training a plot-scale noxious weed identification model according to the Embodiment 1 of the present application.

Further, as shown in FIG. 4, a process of training the plot-scale noxious weed identification model includes:

Step 401: Construct a historical plot-scale feature data set.

In an exemplary embodiment, in the step 401, a process of determining the historical plot-scale feature data set includes:

A plurality of historical plot-scale hyperspectral images are sifted based on the historical quadrat-scale feature variable, to sift out a plurality of historical plot-scale hyperspectral images used for noxious weed identification.

The historical plot-scale feature data set is constructed based on the plurality of historical plot-scale hyperspectral images used for noxious weed identification.

Step 402: Obtain a historical quadrat-scale noxious weed identification result.

In the step 402, the historical quadrat-scale noxious weed identification result is derived from historical data measured at sample points within the quadrat.

In an alternative embodiment, the historical quadrat-scale noxious weed identification result in the step 402 may alternatively be obtained in the following ways: identifying the historical near-ground hyperspectral image using the quadrat-scale noxious weed identification model, to obtain the historical quadrat-scale noxious weed identification result. The quadrat-scale noxious weed identification model is an existing random forest model.

Step 403: Train a plot-scale noxious weed identification network by using the historical plot-scale feature data set and the historical quadrat-scale noxious weed identification result, to obtain the plot-scale noxious weed identification model.

In an exemplary embodiment, in the step 403, the plurality of historical plot-scale hyperspectral images used for noxious weed identification are used as input data of the model, and the historical quadrat-scale noxious weed abundance identification result is used as tag data of the model, to train the plot-scale noxious weed identification network, to obtain the plot-scale noxious weed identification model.

Further, the region-scale noxious weed identification network is a three-dimensional convolutional neural network.

The three-dimensional convolutional neural network includes X input layers, three convolution layers, three maximum pooling layers, three fully connected layers, and one output layer. X is a number of bands input by the input layer, and the number of bands is determined according to a corresponding number of bands in the plurality of historical region-scale satellite remote sensing images for noxious weed identification sifted out in the step 302.

Figure 5:
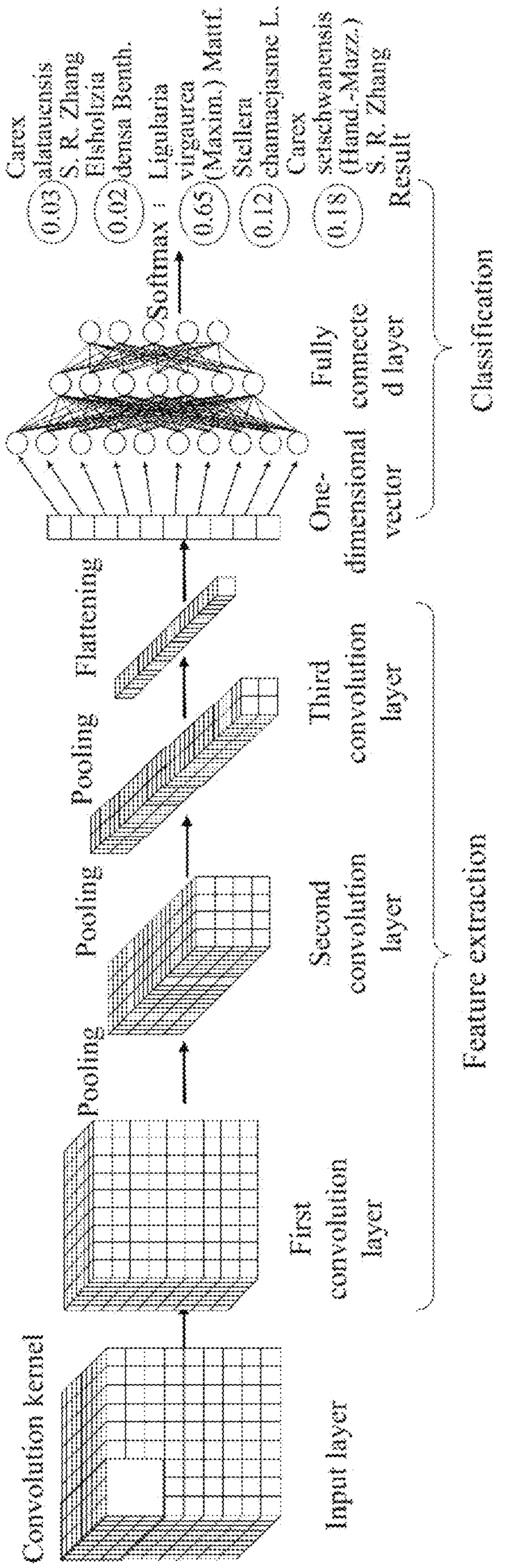
FIG. 5 is a schematic structural diagram of a region-scale noxious weed identification network according to the Embodiment 1 of the present application.

The connection relationship among the layers of the three-dimensional convolutional neural network is shown in FIG. 5. The size of a convolution kernel is 3*3*X and the stride is 1*1*1, and each convolution layer is activated by using the Relu function. The numbers of convolution kernels in the first convolution layer, the second convolution layer, and the third convolution layer are 16, 32 and 64 respectively. In the process of pooling, the stride is set to twice the original stride to compress and extract image features. The Softmax function is used as an activate function for the output layer. The output result is a two-dimensional image with the noxious weed identification result, which is a multi-row and multi-column image, and each pixel in the image outputs a predicted plant type.

Figure 6:
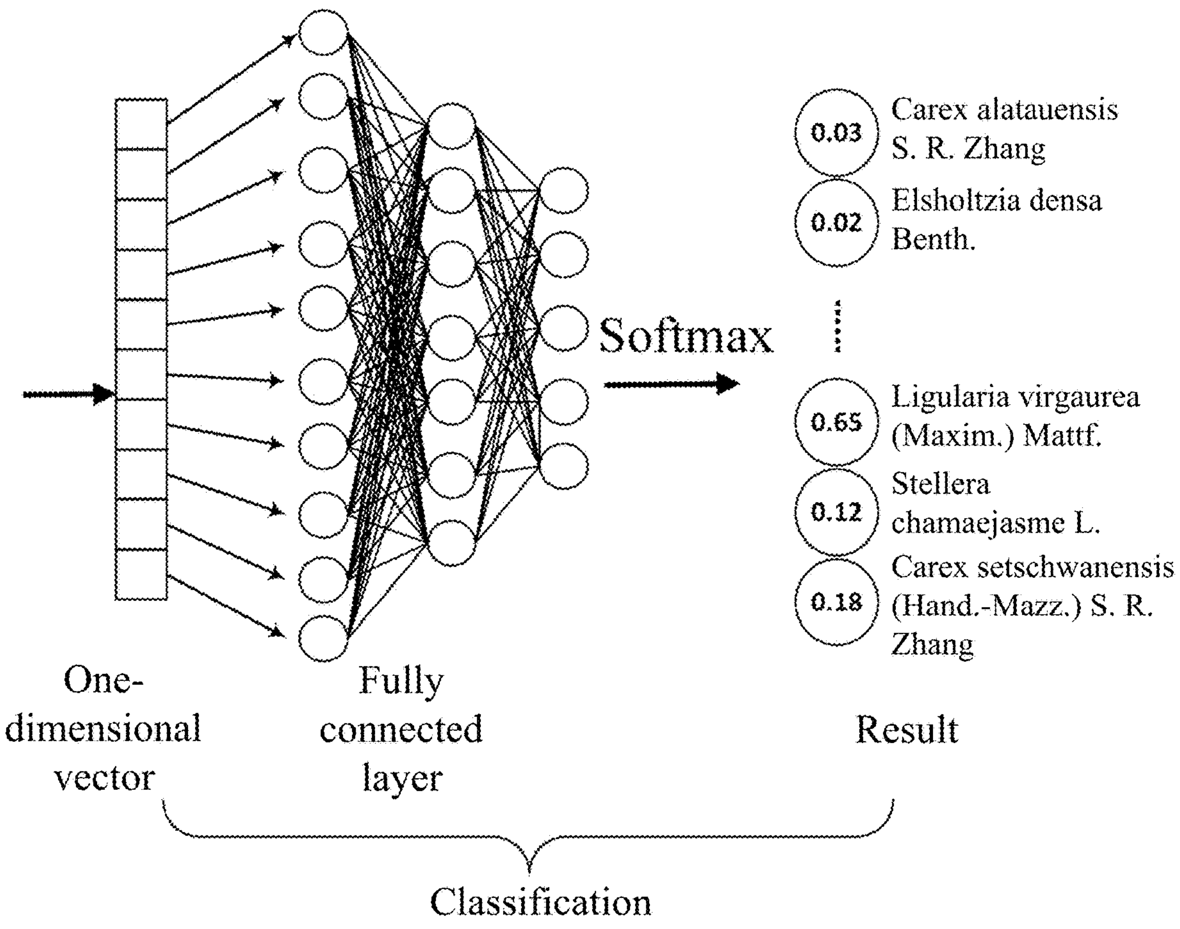
FIG. 6 is a partially enlarged view of the region-scale noxious weed identification network according to the Embodiment 1 of the present application.

As shown in FIG. 6, for each pixel, the three-dimensional convolutional neural network calculates the probability of each plant type at the pixel, and select the plant type with the highest probability as the plant type at the pixel, which is finally presented in each pixel of the two-dimensional image with the noxious weed identification result. For example, the probabilities of *Carex alatauensis* S. R. Zhang, *Elsholtzia densa* Benth., *Ligularia virgaurea* (Maxim.) Mattf., *Stellera chamaejasme* L., and *Carex setschwanensis* (Hand.-Mazz.) S. R. Zhang are 0.03, 0.02, 0.65, 0.12, and 0.18, respectively. The highest probability is *Ligularia virgaurea* (Maxim.) Mattf., and therefore the plant type at the pixel is determined as *Ligularia virgaurea* (Maxim.) Mattf.

Further, the historical near-ground hyperspectral image includes a plurality of sub-images.

Figure 7:
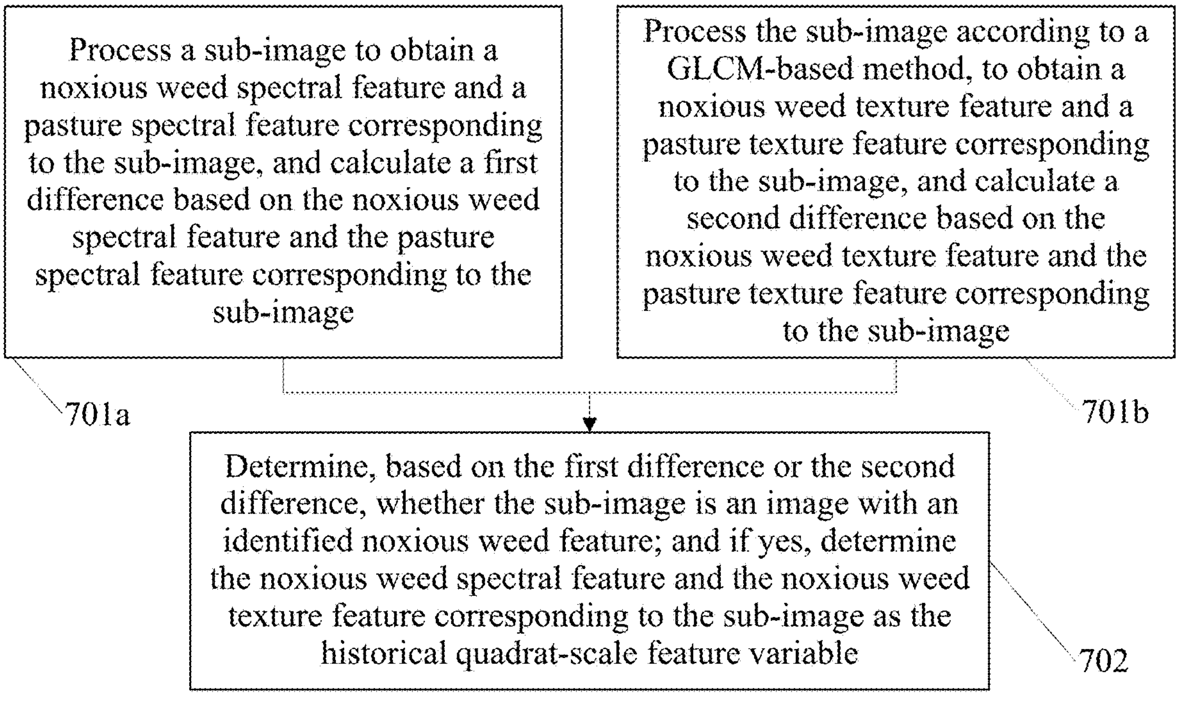
FIG. 7 is a schematic diagram of a process of determining a historical quadrat-scale feature variable according to the Embodiment 1 of the present application.

Further, as shown in FIG. 7, a process of determining the historical quadrat-scale feature variable includes:

performing following operations on each sub-image:

Step 701*a*: Process the sub-image to obtain a noxious weed spectral feature and a pasture spectral feature corresponding to the sub-image, and calculate a first difference based on the noxious weed spectral feature and the pasture spectral feature corresponding to the sub-image.

The spectral feature includes: band reflectance, and first derivative spectrum and a spectral index calculated based on a reflectance image.

The first difference includes: a difference between noxious weed band reflectance and pasture band reflectance, a difference between noxious weed first derivative spectrum and pasture first derivative spectrum, and a difference between a noxious weed spectral index and a pasture spectral index.

Step 701*b*: Process the sub-image is processed according to a GLCM-based method, to obtain a noxious weed texture feature and a pasture texture feature corresponding to the sub-image, and calculate a second difference based on the noxious weed texture feature and the pasture texture feature corresponding to the sub-image.

The texture feature includes: a gray value mean, a gray value variance, image contrast, image entropy, an image second moment, image correlation, image synergy, and image anisotropy.

The second difference includes: a difference between a noxious weed gray value mean and a pasture gray value mean, a difference between a noxious weed gray value variance and a pasture gray value variance, a difference between noxious weed image contrast and pasture image contrast, a difference between noxious weed image entropy and pasture image entropy, a difference between a noxious weed image second moment and a pasture image second moment, a difference between noxious weed image correlation and pasture image correlation, a difference between noxious weed image synergy and pasture image synergy, and a difference between noxious weed image anisotropy and pasture image anisotropy.

Step 702: Determine, based on the first difference or the second difference, whether the sub-image is an image with an identified noxious weed feature; and if yes, determine the noxious weed spectral feature and the noxious weed texture feature corresponding to the sub-image as the historical quadrat-scale feature variable.

Said determining, based on the first difference or the second difference, whether the sub-image is an image with an identified noxious weed feature includes:

Whether the first difference of each sub-image is greater than a first significance threshold is determined by using a Mahalanobis distance method; and if yes, the sub-image is determined as the image with the identified noxious weed feature.

Whether the second difference of each sub-image is greater than a second significance threshold is determined by using the Mahalanobis distance method; and if yes, the sub-image is determined as the image with the identified noxious weed feature.

Figure 8:
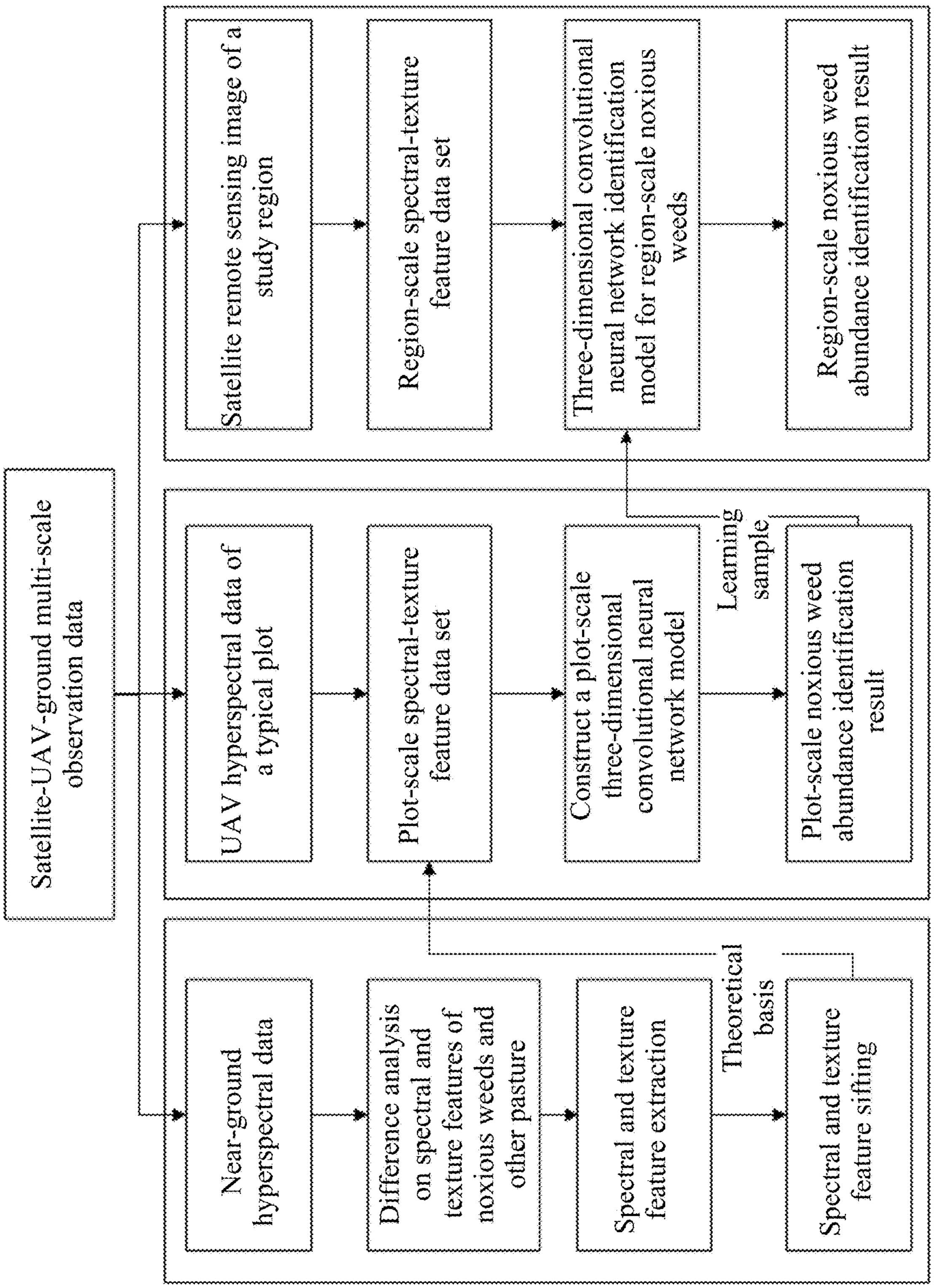
FIG. 8 is an overall architecture diagram of a noxious weed identification method based on a satellite, a UAV, and near-ground images according to Embodiment 2 of the present application.

In an exemplary Embodiment 2, FIG. 8 is an overall architecture diagram of a noxious weed identification method based on a satellite, a UAV, and near-ground images according to the present application.

Firstly, near-ground hyperspectral data, UAV hyperspectral data of a typical plot, and a satellite remote sensing image of a study region are obtained. A near-ground hyperspectral data set in this embodiment is equivalent to the historical near-ground hyperspectral image in the above embodiment; the UAV hyperspectral data of the typical plot in this embodiment is equivalent to the historical plot-scale hyperspectral image in the above embodiment; and the satellite remote sensing image of the study region in this embodiment is equivalent to the historical region-scale satellite remote sensing image in the above embodiment.

A process of obtaining the UAV hyperspectral image of the typical plot is as follows: The UAV is DJI M600 PRO, and an imaging spectrometer is mounted on the UAV. The UAV flies vertically over the plot from a height of about 50 meters above the ground in clear and cloudless weather with low wind speeds, to obtain hyperspectral images between 10 AM and 2 PM.

A preprocessing process of the UAV hyperspectral image of the typical plot is as follows: The UAV gradually collects data across the whole region along a predetermined flight route, and obtains a complete plot-scale hyperspectral image through stitching a plurality of flight strip images. Using the white board laid out in the plot as a reference object, the known radiation intensity of the white board serves as the benchmark for calculating the spectral reflectance image of the plot.

The satellite remote sensing image of the study region is the Sentinel 2A satellite image. The imaging time should align with the field sampling time, at least ensuring that both occur in the same year and season.

Secondly, pure pixels of typical noxious weeds (such as *Stellera chamaejasme* L. and *Ligularia sibirica* (L.) Cass.) and common fine pasture (such as *Carex setschwanensis* (Hand.-Mazz.) S. R. Zhang and *Carex alatauensis* S. R. Zhang) are selected from the near-ground hyperspectral data, and spectral features (including band reflectance, and first derivative spectrum and spectral indices calculated based on reflectance images) of the noxious weeds and common fine pasture are extracted from the pure pixels. In addition, the texture features of the image are calculated according to the GLCM-based method. An extraction method for the texture features is as follows: A first principal component is obtained through principal component transformation of the quadrat-scale hyperspectral image, and the texture features of the first principal component are extracted using the GLCM-based method. The size of the moving window is set to 3*3, and the calculation is performed by moving by each pixel. The extracted texture features include mean, variance, contrast, information entropy, second moment, correlation, synergy, and anisotropy.

After the spectral features and texture features of the noxious weeds and common fine pasture are obtained, the spectral features and texture features are sifted based on the Mahalanobis distance method. Some of the spectral features and texture features are removed, but the spectral features and texture features that are really beneficial to distinguish the noxious weeds from the common fine pasture are sifted out.

The feature sifting includes: Variables that are really beneficial to noxious weed identification are sifted out using the Mahalanobis distance method, so as to reduce the amount of data. The number of degrees of freedom equals to the number of plant types in the quadrat during sifting. When the significance threshold $P<0.01$, the threshold of chi-square distribution is obtained. The Mahalanobis distances of the spectral features (or texture features) of the noxious weeds and fine pasture in each band are calculated. If the Mahalanobis distance is greater than the threshold of chi-square distribution, the spectral feature (or texture feature) corresponding to the band in which the Mahalanobis distance is greater than the threshold is selected as the spectral feature (or texture feature) that is really beneficial to distinguish the noxious weeds from the common fine pasture.

Then, the UAV hyperspectral images of the typical plot are processed through flight strip image stitching and reflectance correction, to obtain the spectral reflectance image of the plot. Then, based on the processed spectral reflectance image and referring to the method for sifting out the spectral features and texture features that are really beneficial to distinguish the noxious weeds from the common fine pasture, the UAV hyperspectral images of the typical plot are sifted to obtain a plot-scale spectral-texture feature data set.

The sifting operation may include: calculating a difference of gray value between images of noxious weeds and common fine pasture in different bands. If the difference is greater than a set threshold, the image is included into the plot-scale spectral-texture feature data set. The purpose of sifting the UAV hyperspectral images of the typical plot is to eliminate invalid images that cannot be used for distinguishing the noxious weeds from the common fine pasture, thus reducing the amount of data, and further improving the training efficiency of the model and the ability of the model to distinguish the noxious weeds from the common fine pasture.

It should be noted that in the process of sifting, the gray value difference between the images of the noxious weeds and common fine pasture in different bands is determined, and the gray value is merely an example of the spectral features and texture features. In practical application, in addition to the gray value, it is necessary to comprehensively compare the differences between various spectral features and texture features, so as to select a number of images that are beneficial to noxious weed identification. The plurality of images beneficial to noxious weed identification may be divided into two parts, one part is used to reflect the noxious weed spectral features, and the other part is used to reflect the noxious weed texture features.

After obtaining the plot-scale spectral-texture feature data set, the plot-scale convolutional neural network is trained by using the plot-scale spectral-texture feature data set, to obtain the plot-scale noxious weed abundance identification model.

Then, the plot-scale hyperspectral image is identified by using the plot-scale noxious weed abundance identification model, to obtain the plot-scale noxious weed abundance identification result. Specifically, a part of sample data of the noxious weeds and other plants measured on the ground is used as a learning sample, and the other part is used as a precision verification sample; an convolutional neural network identification model for plot-scale noxious weeds is trained and constructed, so as to identify the plot-scale noxious weeds and obtain a spatial distribution map of the plot-scale noxious weeds.

Finally, a part of data of a plurality of plot-scale noxious weed abundance identification result is used as a learning sample, and the other part is used as a precision verification sample, to train the region-scale noxious weed abundance convolutional neural network, and the convolutional neural network identification model for region-scale noxious weed abundance is constructed, to complete high-precision extraction of the distribution of the region-scale noxious weed abundance, thereby obtaining the region-scale noxious weed abundance map. According to the region-scale noxious weed spatial differentiation features and invasion in the region-scale noxious weed abundance map, the targeted implementation plan is put forward for noxious weed control.

It should be noted that if the duration is short, such as one week or half a month, and the topography of the target region does not change seasonally, the current region-scale satellite remote sensing image can be directly input into the region-scale noxious weed identification model, to output the region-scale noxious weed abundance identification result without the need for repeated training.

In the process of training the plot (or region)-scale noxious weed identification model, the original hyperspectral images are sifted. In this sifting process, the spectral features and texture features of near-ground quadrat-scale hyperspectral image are extracted.

The present application further provides an application scenario, including a noxious weed identification phase, a noxious weed display phase, and a noxious weed control phase. In the noxious weed identification phase, the noxious weed identification method based on a satellite, a UAV, and near-ground images provided in the present application is adopted to identify a current region-scale satellite remote sensing image, to obtain a region-scale noxious weed abundance identification result. In the noxious weed display phase, the distribution of noxious weeds in the satellite remote sensing image is displayed on a hand-held terminal device based on the noxious weed abundance identification result obtained in the noxious weed identification phase. In the noxious weed control phase, an operator carry out control measures for the noxious weeds according to the distribution of noxious weeds displayed on the hand-held terminal device.

Figure 9:
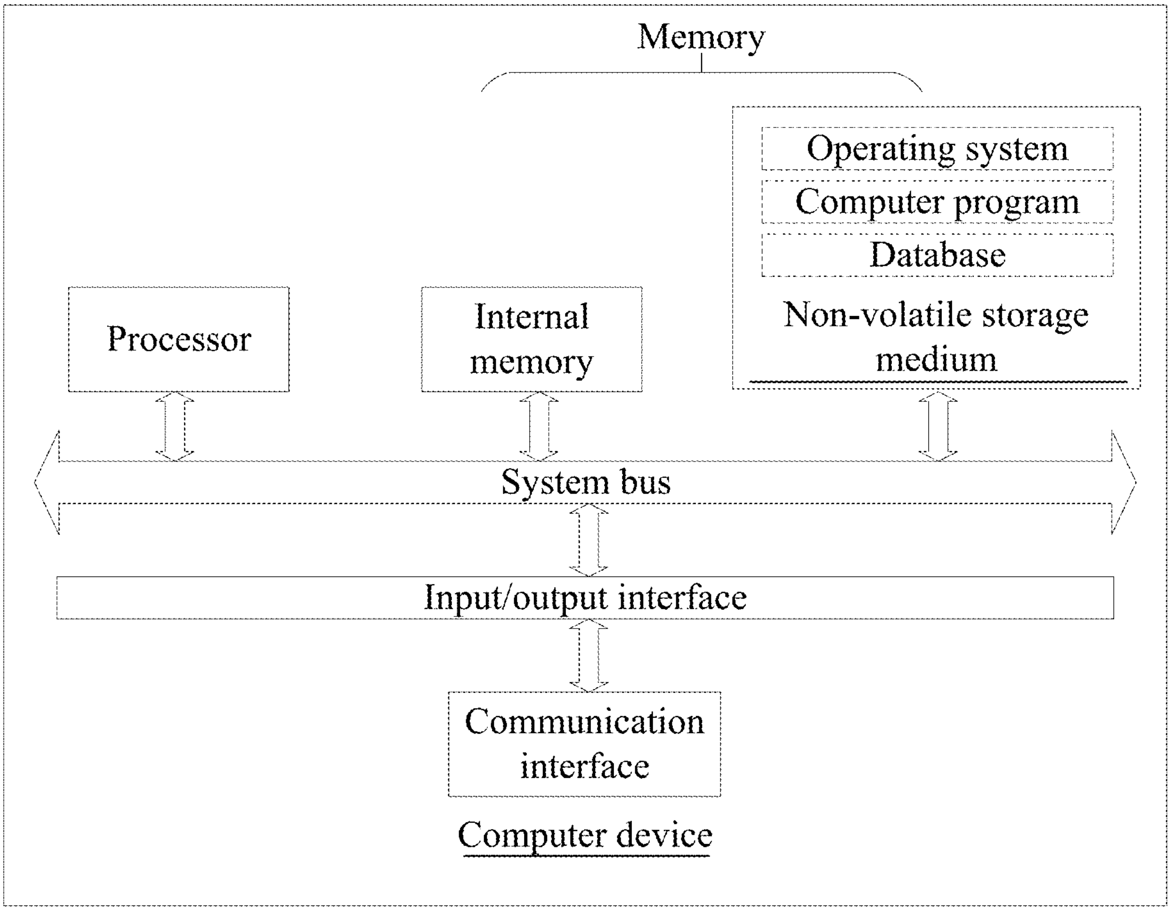
FIG. 9 is a schematic structural diagram of a computer device according to Embodiment 3 of the present application.

In an exemplary embodiment 3, a computer device is provided. The computer device may be a server or a terminal, and an internal structure thereof may be as shown in FIG. 9. The computer device includes a processor, a memory, an input/output (I/O) interface, and a communication interface. The processor, the memory and the I/O interface are connected through a system bus. The communication interface is connected to the system bus through the I/O interface. The processor of the computer device is configured to provide computing and control capabilities. The memory of the computer device includes a non-volatile storage medium and an internal memory. The non-volatile storage medium stores an operating system, a computer program, and a database. The internal memory provides an environment for operations of the operating system and the computer program in the non-volatile storage medium. The database of the computer device is configured to store video tag processing data. The input/output interface of the computer device is configured to exchange information between the processor and an external device. The communication interface of the computer device is configured to communicate with an external terminal through a network. The computer program, when executed by the processor, realizes the noxious weed identification method based on a satellite, a UAV, and near-ground images.

Those skilled in the art may understand that the structure shown in FIG. 9 is only a block diagram of a part of the structure related to the solutions of the present application and does not constitute a limitation on a computer device to which the solutions of the present application are applied. Specifically, the computer device may include more or less components than those shown in the figure, or combine some components, or have different component arrangements.

In an exemplary embodiment 4, a computer device is further provided, including a memory and a processor. The memory stores a computer program, and the computer program is executed by the processor to implement the steps of the above method embodiments.

In an exemplary embodiment 5, a computer-readable storage medium is provided. The computer-readable storage medium stores a computer program, and the computer program is executed by a processor to implement the steps of the above method embodiments.

In an exemplary embodiment 6, a computer program product is provided, including a computer program. The computer program is executed by a processor to implement the steps of the above method embodiments.

It is to be noted that user information (including but not limited to device information of the user, personal information of the user and the like) and data (including but not limited to data for analysis, data for storage, data for exhibition and the like) in the present application are information and data authorized by the user or fully authorized by each party, and relevant data shall be acquired, used and processed according to laws, regulations and standards of related countries and regions.

Those of ordinary skill in the art may understand that all or some of the procedures in the method of the foregoing embodiments may be implemented by a computer program instructing related hardware. The computer program may be stored in a nonvolatile computer-readable storage medium. When the computer program is executed, the procedures in the embodiments of the foregoing method may be performed. Any reference to a memory, a database, or other media used in the embodiments of the present application may include a non-volatile and/or volatile memory. The nonvolatile memory may include a read-only memory (ROM), a magnetic tape, a floppy disk, a flash memory, an optical memory, a high-density embedded nonvolatile memory, a resistive random access memory (ReRAM), a magnetoresistive random access memory (MRAM), a ferroelectric random access memory (FRAM), a phase change memory (PCM), a graphene memory, etc. The volatile memory may include a random access memory (RAM) or an external cache memory. As an illustration rather than a limitation, the RAM may be in various forms, such as a static random access memory (SRAM) or a dynamic random access memory (DRAM).

The technical characteristics of the above embodiments can be employed in arbitrary combinations. To provide a concise description of these embodiments, all possible combinations of all the technical characteristics of the above embodiments may not be described; however, these combinations of the technical characteristics should be construed as falling within the scope defined by the specification as long as no contradiction occurs.

Several examples are used herein for illustration of the principles and implementations of this application. The description of the foregoing examples is used to help illustrate the method of this application and the core principles thereof. In addition, those of ordinary skill in the art can make various modifications in terms of specific implementations and scope of application in accordance with the teachings of this application. In conclusion, the content of the present specification shall not be construed as a limitation to this application.

What is claimed is:

1. A noxious weed identification method based on a satellite, an unmanned aerial vehicle (UAV), and near-ground images, comprising:

obtaining a current region-scale satellite remote sensing image of a target region; and inputting the current region-scale satellite remote sensing image into a region-scale noxious weed identification model matching the current region-scale satellite remote sensing image, to obtain a region-scale noxious weed abundance identification result, wherein a process of determining the region-scale noxious weed identification model comprises:

obtaining a historical plot-scale hyperspectral image of the target region, wherein the historical plot-scale hyperspectral image is collected by the UAV;

inputting the historical plot-scale hyperspectral image into a plot-scale noxious weed identification model matching the historical plot-scale hyperspectral image, to obtain a predicted plot-scale noxious weed abundance identification result; and training a region-scale noxious weed identification network based on a historical region-scale feature data set and the predicted plot-scale noxious weed abundance identification result, to obtain the region-scale noxious weed identification model, wherein the historical region-scale feature data set is a data set obtained by sifting historical region-scale satellite remote sensing images based on a historical quadrat-scale feature variable; and the historical quadrat-scale feature variable is a feature obtained by processing a historical near-ground hyperspectral image of the target region.

2. The noxious weed identification method based on a satellite, a UAV, and near-ground images according to claim 1, wherein a process of training the plot-scale noxious weed identification model comprises:

constructing a historical plot-scale feature data set;

obtaining a historical quadrat-scale noxious weed identification result; and training a plot-scale noxious weed identification network by using the historical plot-scale feature data set and the historical quadrat-scale noxious weed identification result, to obtain the plot-scale noxious weed identification model.

3. The noxious weed identification method based on a satellite, a UAV, and near-ground images according to claim 2, wherein a process of determining the historical plot-scale feature data set comprises:

sifting a plurality of historical plot-scale hyperspectral images based on the historical quadrat-scale feature variable, to sift out a plurality of historical plot-scale hyperspectral images used for noxious weed identification; and constructing the historical plot-scale feature data set based on the plurality of historical plot-scale hyperspectral images used for noxious weed identification.

4. The noxious weed identification method based on a satellite, a UAV, and near-ground images according to claim 1, wherein a process of determining the historical region-scale feature data set comprises:

obtaining the plurality of historical region-scale satellite remote sensing images of the target region;

sifting the plurality of historical region-scale satellite remote sensing images based on the historical quadrat-scale feature variable, to sift out a plurality of historical region-scale satellite remote sensing images used for noxious weed identification; and constructing the historical region-scale feature data set based on the plurality of historical region-scale satellite remote sensing images used for noxious weed identification.

5. The noxious weed identification method based on a satellite, a UAV, and near-ground images according to claim 1, wherein the region-scale noxious weed identification network is a three-dimensional convolutional neural network.

6. The noxious weed identification method based on a satellite, a UAV, and near-ground images according to claim 5, wherein the three-dimensional convolutional neural network comprises X input layers, three convolution layers, three maximum pooling layers, three fully connected layers, and one output layer.

7. The noxious weed identification method based on a satellite, a UAV, and near-ground images according to claim 1, wherein the historical near-ground hyperspectral image comprises a plurality of sub-images, and a process of determining the historical quadrat-scale feature variable comprises:

performing following operations on each sub-image:

processing the sub-image to obtain a noxious weed spectral feature and a pasture spectral feature corresponding to the sub-image, and calculating a first difference based on the noxious weed spectral feature and the pasture spectral feature corresponding to the sub-image;

processing the sub-image according to a gray-level co-occurrence matrix (GLCM)-based method, to obtain a noxious weed texture feature and a pasture texture feature corresponding to the sub-image, and calculating a second difference based on the noxious weed texture feature and the pasture texture feature corresponding to the sub-image; and determining, based on the first difference or the second difference, whether the sub-image is an image with an identified noxious weed feature; and if yes, determining the noxious weed spectral feature and the noxious weed texture feature corresponding to the sub-image as the historical quadrat-scale feature variable.

8. The noxious weed identification method based on a satellite, a UAV, and near-ground images according to claim 7, wherein the spectral feature comprises: band reflectance, and first derivative spectrum and a spectral index calculated based on a reflectance image;

the first difference comprises: a difference between noxious weed band reflectance and pasture band reflectance, a difference between noxious weed first derivative spectrum and pasture first derivative spectrum, and a difference between a noxious weed spectral index and a pasture spectral index;

the texture feature comprises: a gray value mean, a gray value variance, image contrast, image entropy, an image second moment, image correlation, image synergy, and image anisotropy; and the second difference comprises: a difference between a noxious weed gray value mean and a pasture gray value mean, a difference between a noxious weed gray value variance and a pasture gray value variance, a difference between noxious weed image contrast and pasture image contrast, a difference between noxious weed image entropy and pasture image entropy, a difference between a noxious weed image second moment and a pasture image second moment, a difference between noxious weed image correlation and pasture image correlation, a difference between noxious weed image synergy and pasture image synergy, and a difference between noxious weed image anisotropy and pasture image anisotropy.

9. The noxious weed identification method based on a satellite, a UAV, and near-ground images according to claim 7, wherein said determining, based on the first difference or the second difference, whether the sub-image is an image with an identified noxious weed feature comprises:

determining, by using a Mahalanobis distance method, whether the first difference of each sub-image is greater than a first significance threshold; and if yes, determining the sub-image as the image with the identified noxious weed feature; and determining, by using the Mahalanobis distance method, whether the second difference of each sub-image is greater than a second significance threshold; and if yes, determining the sub-image as the image with the identified noxious weed feature.

10. A computer device, comprising a memory, a processor and a computer program stored in the memory and executable on the processor, wherein the processor executes the computer program to implement the noxious weed identification method based on a satellite, a UAV, and near-ground images according to claim 1.

11. The computer device according to claim 10, wherein a process of training the plot-scale noxious weed identification model comprises:

constructing a historical plot-scale feature data set;

obtaining a historical quadrat-scale noxious weed identification result; and training a plot-scale noxious weed identification network by using the historical plot-scale feature data set and the historical quadrat-scale noxious weed identification result, to obtain the plot-scale noxious weed identification model.

12. The computer device according to claim 11, wherein a process of determining the historical plot-scale feature data set comprises:

sifting a plurality of historical plot-scale hyperspectral images based on the historical quadrat-scale feature variable, to sift out a plurality of historical plot-scale hyperspectral images used for noxious weed identification; and constructing the historical plot-scale feature data set based on the plurality of historical plot-scale hyperspectral images used for noxious weed identification.

13. The computer device according to claim 10, wherein a process of determining the historical region-scale feature data set comprises:

obtaining the plurality of historical region-scale satellite remote sensing images of the target region;

sifting the plurality of historical region-scale satellite remote sensing images based on the historical quadrat-scale feature variable, to sift out a plurality of historical region-scale satellite remote sensing images used for noxious weed identification; and constructing the historical region-scale feature data set based on the plurality of historical region-scale satellite remote sensing images used for noxious weed identification.

14. The computer device according to claim 10, wherein the region-scale noxious weed identification network is a three-dimensional convolutional neural network.

15. The computer device according to claim 14, wherein the three-dimensional convolutional neural network comprises X input layers, three convolution layers, three maximum pooling layers, three fully connected layers, and one output layer.

16. The computer device according to claim 10, wherein the historical near-ground hyperspectral image comprises a plurality of sub-images, and a process of determining the historical quadrat-scale feature variable comprises:

performing following operations on each sub-image:

processing the sub-image to obtain a noxious weed spectral feature and a pasture spectral feature corresponding to the sub-image, and calculating a first difference based on the noxious weed spectral feature and the pasture spectral feature corresponding to the sub-image;

processing the sub-image according to a gray-level co-occurrence matrix (GLCM)-based method, to obtain a noxious weed texture feature and a pasture texture feature corresponding to the sub-image, and calculating a second difference based on the noxious weed texture feature and the pasture texture feature corresponding to the sub-image; and determining, based on the first difference or the second difference, whether the sub-image is an image with an identified noxious weed feature; and if yes, determining the noxious weed spectral feature and the noxious weed texture feature corresponding to the sub-image as the historical quadrat-scale feature variable.

17. The computer device according to claim 16, wherein the spectral feature comprises: band reflectance, and first derivative spectrum and a spectral index calculated based on a reflectance image;

the first difference comprises: a difference between noxious weed band reflectance and pasture band reflectance, a difference between noxious weed first derivative spectrum and pasture first derivative spectrum, and a difference between a noxious weed spectral index and a pasture spectral index;

the texture feature comprises: a gray value mean, a gray value variance, image contrast, image entropy, an image second moment, image correlation, image synergy, and image anisotropy; and the second difference comprises: a difference between a noxious weed gray value mean and a pasture gray value mean, a difference between a noxious weed gray value variance and a pasture gray value variance, a difference between noxious weed image contrast and pasture image contrast, a difference between noxious weed image entropy and pasture image entropy, a difference between a noxious weed image second moment and a pasture image second moment, a difference between noxious weed image correlation and pasture image correlation, a difference between noxious weed image synergy and pasture image synergy, and a difference between noxious weed image anisotropy and pasture image anisotropy.

18. The computer device according to claim 16, wherein said determining, based on the first difference or the second difference, whether the sub-image is an image with an identified noxious weed feature comprises:

determining, by using a Mahalanobis distance method, whether the first difference of each sub-image is greater than a first significance threshold; and if yes, determining the sub-image as the image with the identified noxious weed feature; and determining, by using the Mahalanobis distance method, whether the second difference of each sub-image is greater than a second significance threshold; and if yes, determining the sub-image as the image with the identified noxious weed feature.

* * * * *